United States Patent [19]
Jackson

[11] 3,994,132
[45] Nov. 30, 1976

[54] APPARATUS FOR CONVERTING HEAT ENERGY TO MECHANICAL ENERGY

[76] Inventor: Robert E. Jackson, 6227 Stearns St., Riverside, Calif. 92504

[22] Filed: Sept. 4, 1975

[21] Appl. No.: 610,452

[52] U.S. Cl. .................................. 60/325; 60/527; 417/322; 417/379
[51] Int. Cl.² .......................................... F03G 7/06
[58] Field of Search ............ 60/325, 527, 528, 721; 417/379, 322

[56] References Cited
UNITED STATES PATENTS

| | | | |
|---|---|---|---|
| 2,867,224 | 1/1959 | Martiniak et al. | 417/322 |
| 3,150,592 | 9/1964 | Stec | 417/322 |
| 3,418,980 | 12/1968 | Benson | 417/322 X |
| 3,768,931 | 10/1973 | Willis, Jr. | 417/322 |

Primary Examiner—Allen M. Ostrager
Attorney, Agent, or Firm—John H. Crowe

[57] ABSTRACT

Apparatus for converting heat derived from a heated fluid into mechanical energy comprising a double-walled shell having a high coefficient of thermal expansion and other preferred qualities, such as a relatively high coefficient of heat conductivity and low specific heat, the shell being immersed in a fluid within a container having a relatively low coefficient of thermal expansion and other qualities. When heated fluid is passed between the walls of the shell, expansion of the latter displaces fluid from within the container to actuate a fluid operated device. Alternatively, passage of a cold fluid between the walls of the shell causes the shell to contract and thus enable the displaced fluid to return into the container to complete an operating cycle.

18 Claims, 8 Drawing Figures

APPARATUS FOR CONVERTING HEAT ENERGY TO MECHANICAL ENERGY

BACKGROUND OF THE INVENTION

This invention relates to apparatus for converting heat energy into mechanical energy.

Vast amounts of heat energy derived either from natural sources such as solar, geothermal and the like processes or by combustion of petroleum and other products, is currently being wasted. Although internal and external combustion engines, turbines, etc., have been developed to transform heat energy into mechanical power, such devices of which I am aware generally require utilization of heat of relatively high and consistent temperature. For example, internal and external combustion engines require combustion temperatures of several thousand degrees F, and much of this heat, particularly in the lower temperature ranges, is wasted. Internal combustion engines must be cooled and the heat extracted in such cooling is generally wasted, as are the exhaust gases. In steam and other external combustionn engines, much of the heat required to generate steam or other expandable fluids is generally wasted and passes through an exhaust system into the atmosphere.

SUMMARY OF THE INVENTION

A principal object of the present invention is to utilize low temperature heat energy, such as that obtained from natural sources, or that which is otherwise normally wasted, to generate mechanical power.

Another object is to utilize heat energy ranging from relatively low to relatively high temperatures to generate mechanical power.

Another object is to provide a highly efficient apparatus for generating mechanical power from low and/or high temperature heat sources.

According to the present invention, heat energy of any temperature which may be obtained either from natural sources or from otherwise wasted heat-of-combustion, nuclear fission, or the like heat sources, is transferred by way of a suitable fluid to a body having a relatively high coefficient of thermal expansion and other preferred qualities such as a relatively high coefficient of heat conductivity, low specific heat and relatively high strength properties. Such body is immersed in a contained second fluid so that expansion or contraction of the body causes displacement of the second fluid to operate a fluid operated device, such as a fluid-operated piston, piston engine, turbine or similar fluid-operated motor. By choosing the second fluid to have a relatively high coefficient of thermal expansion, I can obtain a further degree of efficiency of operation.

According to one aspect of the invention, the above is accomplished by forming the body of a double-walled element which I will hereinafter term a shell or body. The inner and outer walls or vessels of such body are formed of a material having a relatively high coefficient of thermal expansion, a relatively high coefficient of heat conductivity and adequate strength. Aluminum-magnesium alloys have been found to be satisfactory for this purpose. Such shell is mounted in a fluid-tight container which has a relatively low coefficient of thermal expansion and adequate strength, such as cast steel. The container communicates with a fluid-operated device which, in itself, forms no part of the present invention but which, as an example, is depicted as a fluid-operated press. The space between the shell and container, as well as the connection to the fluid-operated device, is preferably filled with a fluid having a relatively high coefficient of thermal expansion, including good heat conductivity and low specific heat. As the shell expands or contracts, depending on the temperature of the fluid applied to it, it displaces the fluid in the container to operate the fluid-operated device. Hereafter, I shall term this fluid the outer space fluid or liquid.

The space within the inner wall of the shell is preferably filled with a liquid having a minimum coefficient of thermal expansion. Hereafter, I shall term such fluid the inner space fluid or liquid.

According to a more specific aspect of the invention, the inner space fluid is utilized to inject hot and cold fluids into the space between the shell walls.

Considering, for example, a hollow spherical shell with its inner and outer walls formed of an aluminum-magnesium alloy having a linear coefficient of thermal expansion of 0.00136 units per 100° F, and noting that the volumetric expansion of a sphere is approximately 3 times its linear expansion coefficient, it can be determined that such a body of 98 centimeters in diameter will displace more than 2000 cubic centimeters of liquid for each rise in temperature of 100° F. In addition, the displaced liquid, because of its own high coefficient of thermal expansion and other preferred heat characteristics, such as a relatively high coefficient of heat conductivity, and because of the transmission of heat thereto by the shell, will effect further volumetric displacement of itself, resulting in correspondingly greater actuation of the fluid-operated device. The spherical shape will also provide the highest possible pressures with the lowest internal metal stresses.

DESCRIPTION OF PREFERRED EMBODIMENTS

Figure 1:
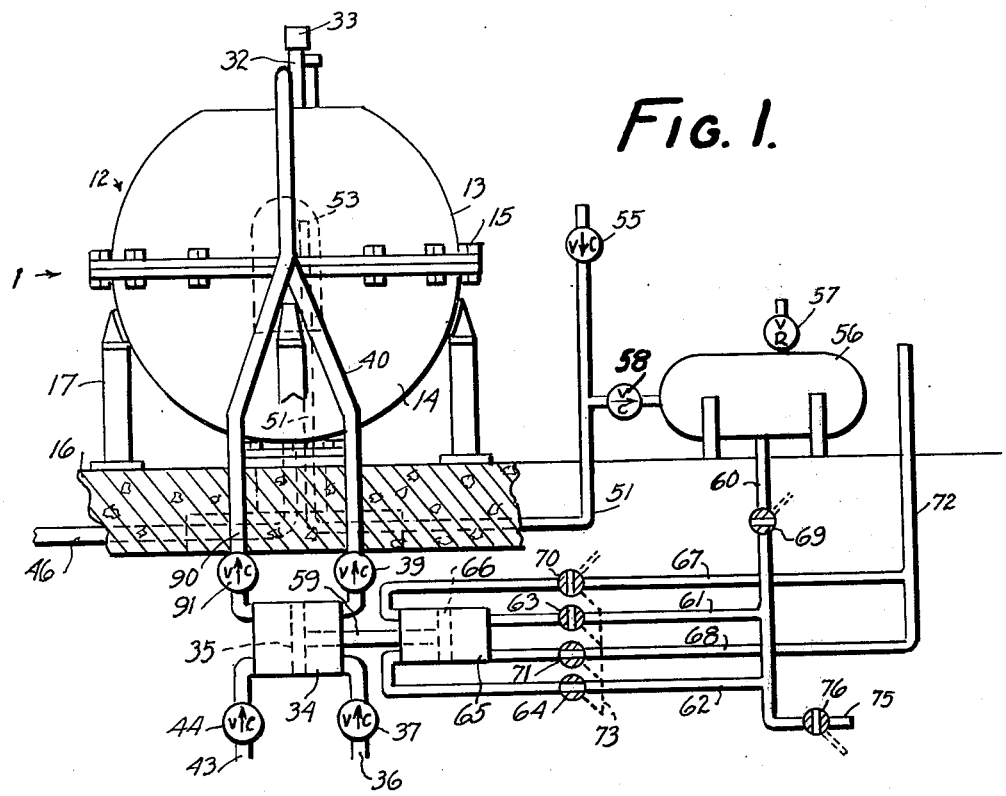
FIG. 1 is a schematic view of a heat energy conversion apparatus embodying a preferred form of the invention.

Referring to the drawings, the apparatus comprises a displacement unit including a spherical pressure container, generally indicated at 12, which is formed of a material having a relatively low coefficient of thermal expansion, such as cast steel. The container is formed of mating flanged upper and lower halves 13 and 14, respectively, secured together by bolts 15, and sealed by a suitable gasket (not shown).

The container 12 is supported above a concrete floor slab 16 by columns 17. Also, the lower half 14 had a flanged opening 8 (FIG. 3) secured and sealed over a coextensive opening 9 formed in a compartment 19 by bolts 21 which are anchored in the slab 16.

The upper half 13 of the pressure container has an opening 22 therein surrounded by a depressed flange 23 which is secured through a suitable sealing gasket (not shown) to the upper end of a spherical shell generally indicated at 24. The latter comprises two nested substantially concentric spheres 25 and 26, both formed of a material having a relatively high coefficient of thermal expansion, preferably an aluminum-magnesium alloy.

Bolts 27 clamp the shell spheres 25 and 26 to the flange 23, and spacers 28 hold the spheres in spaced relation to each other to form a spherical heating chamber or cavity 29, between them.

The bolts 27 also support the shell 24 in spaced relation to the wall of the pressure container 12 to form an outer spherical fluid space 30. The bolts 27 thus form the sole support for suspending the shell 24 within the container 12.

The spheres 25 and 26 are additionally secured in spaced relation to each other at different points by belts 80 which pass through spacers 81 and are clamped against the spheres by nuts 82 to cause the spheres to expand and contract together as an integral unit when fluid of differing termperature flows therebetween.

The outer space 30 communicates through a conduit 83 (FIG. 2) with the interior of a cylinder 84 forming, as an example, part of a hydraulic press generally indicated at 85. A piston 86 is movable in the cylinder and is biased upwardly by a compression spring 87. The ram 88 of the piston 86 may be used to exert force against an object placed on the bed 89 of the press.

It should be noted that the hydraulic press 85 represents only one form of hydraulically operated device, and that many other types of devices could, with obvious modifications, be utilized, such as hydraulically operated motors, turbines, jacks, pumps, electric generators, etc.

The outer space 30 intermediate the sphere 25 and the pressure container 12, as well as the upper part of the cylinder 84, and interior of compartment 19 are preferably filled with a liquid having a relatively high coefficient of expansion, high thermal conductivity and low heat capacity. Satisfactory liquids for the purpose include benzol, methyl alcohol, and turpentine.

A filler tube 32 is attached to the pressure container 12 to enable the outer space 30 to be filled, and a remvoable cap 33 is provided to seal the tube.

Means are provided to alternately cause a hot and a cold fluid to flow through the heating chamber 29 whereby to cause the shell 24 to alternately expand and contract. For this purpose, a double-ended pump cylinder 34 (FIG. 1) is provided, having a reciprocating piston 35 therein. A hot liquid intake 36 is connected through a check valve 37 to the right-hand end of the cylinder 34. The intake 36 may be connected to any suitable source of relatively hot liquid which would otherwise generally be wasted. Such liquid may be of any temperature, and under no pressure. Although gas, steam and many other gases or liquids may be used to convey heat, I prefer to use water because of its low cost and ready availability.

Although in most cases heat energy would be derived from hot waste fluids and alternately applying a relatively cold fluid, the same result could be obtained by alternately applying a cold waste fluid and a relatively hot fluid.

An outlet conduit 40 is connected to the right-hand end of the cylinder 34 through a check valve 39. The opposite end of the conduit 40 is connected to a spreader manifold 41 (FIGS. 3 and 4) located in the upper end of the heating chamber 29, intermediate spheres 25 and 26. Such manifold has a series of outwardly diverging spreader conduits 42, as seen in FIG. 4, which insure a uniform flow of liquid under gravity in all directions within the heating chamber 29.

A cold water intake conduit 43 is connected through a check valve 44 to the left-hand end of the pump cylinder 34. An outlet conduit 90 is also connected through a check valve 91 to the left-hand end of cylinder 34 and is branched at 45 to the upper end of the conduit 40 leading to the spreader manifold 41.

The intake conduit 43 may be connected to any suitable source of fluid having a lower temperature than that applied to the hot fluid intake conduit 36. Preferably, such cooling fluid is water.

A drain conduit 46 is secured to the lower end of sphere 25 to communicate with the heating chamber 29. Such conduit extends through the compartment 19 of the pressure vessel 12 and is sealed at 47 to prevent leakage. Conduit 46 has a flexible section 48 therein within the compartment 19 to permit movement of the shell 24 due to expansion and contraction thereof relative to its upper point of support by the bolts 27. Thus, hot or cold fluid flowing downwardly through the heating chamber 29 by gravity is collected by the drain conduit 46 and led off to a suitable discharge point, or the discharged fluid could be pumped back to the heat source to recover the remaining heat for continuous recycling.

A vent pipe 50 is attached to the upper part of sphere 25 to vent the cavity 29 and thus permit any fluid within said chamber to quickly drain out through the drain conduit 46.

Figure 2:
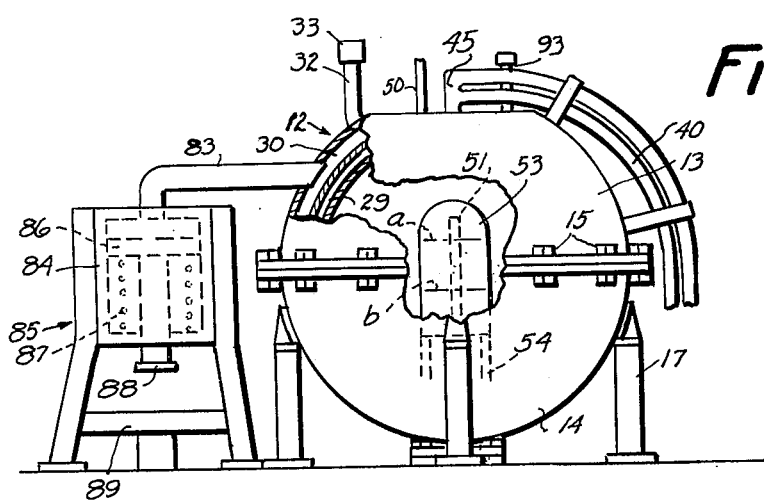
FIG. 2 is an end view of the apparatus, taken in the direction of the arrow in FIG. 1.
Figure 3:
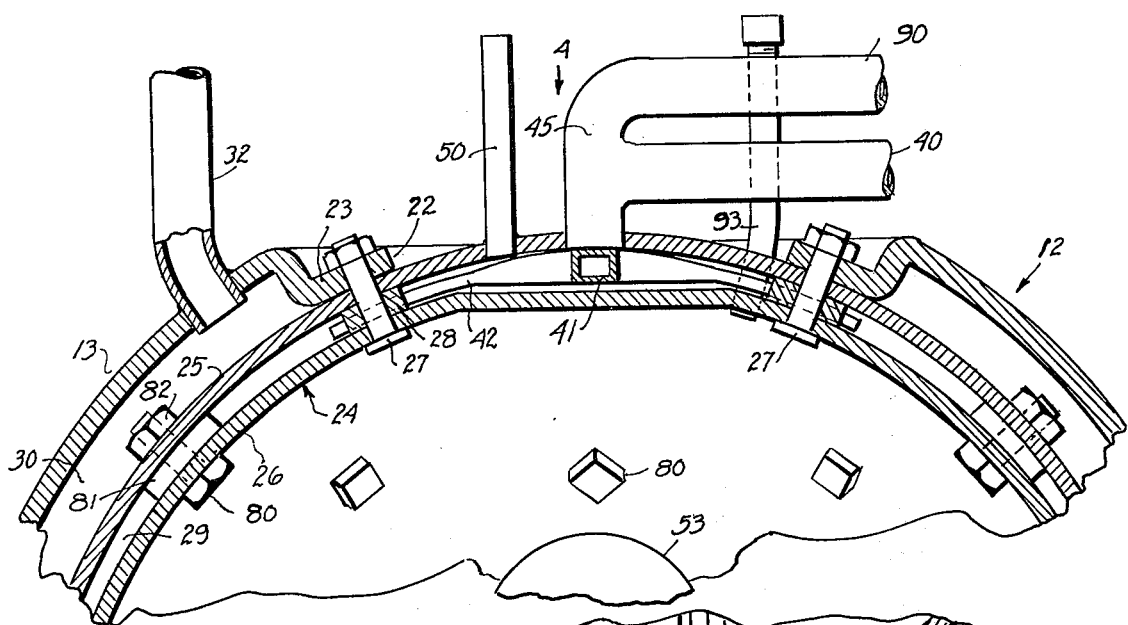
FIG. 3 is an enlarged sectional view, with parts broken away, through the displacement unit.
Figure 3:
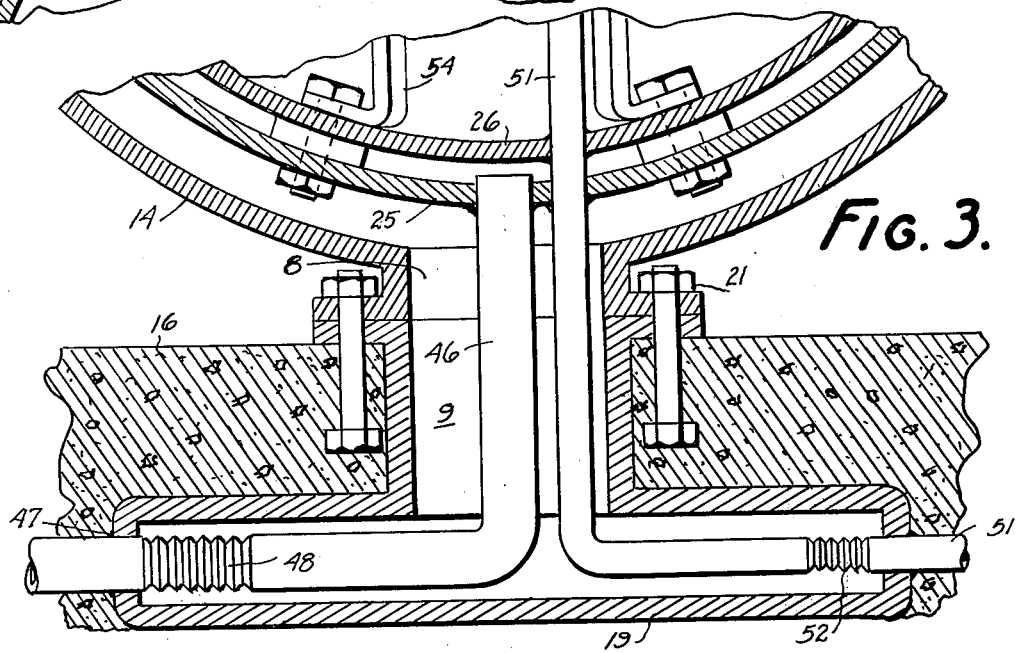
Figure 4:
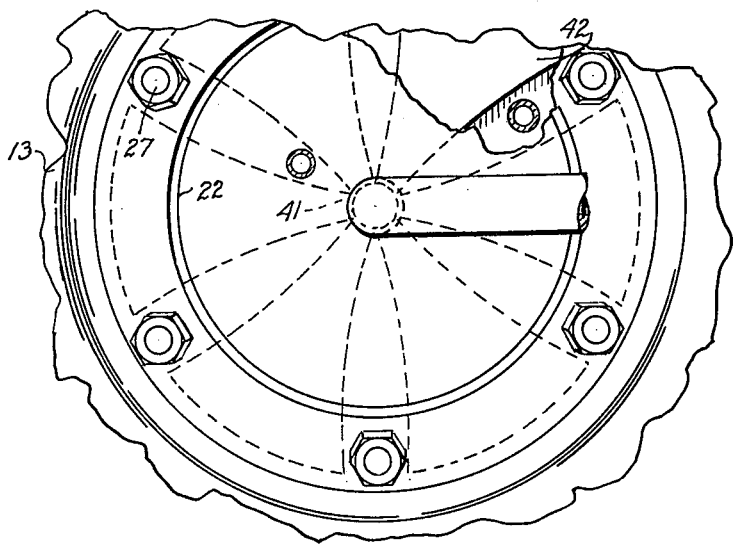
FIG. 4 is a top plan view of a portion of the displacement unit and is taken in the direction of the arrow 4 of FIG. 3.

As seen in FIGS. 1, 2 and 3, a tank 53, forming an air pump, is located within the inner sphere 26 and is supported therein by columns 54. Tank 53 is open at its lower end and closed at its upper end. An air conduit 51 passes through the lower portions of both spheres 25 and 26 and communicates with an upper air space within the tank 53. Such conduit passes through the wall of compartment 19 and is suitable sealed thereto. A flexible section 52 in the conduit 51 accommodates expansion and contraction of the shell 24. Conduit 54 is connected through check valve 58 (FIG. 1) to an air reservoir 56.

The inner space within sphere 26 and the lower portion of tank 53 is filled by means of a normally sealed filler tube 93 with a liquid having a minimum coefficient of expansion, such as water, glycerine or ethylene glycol, and when the shell 24 is in its contracted condition, the inner space liquid extends to an upper level, i.e., $a$ (FIG. 2), in the tank 53. This maintains the air in the upper end of the tank 53 and in reservoir 56 at a pressure determined by a pressure-relief valve 57 connected to the reservoir. A check valve 55, which is open to the atmosphere, is connected to the conduit 51 to permit air to be drawn into the tank 53 at certain times when the shell 24 is expanding. At such times, the liquid level in the tank 53 may approach a lower level $b$.

An outlet conduit 60 leads from the reservoir 56 and communicates with conduits 61 and 62 which are connected through valves 63 and 64, respectively, to opposite ends of a cylinder 65 in which is slidingly mounted an air-operated piston 66 connected to the piston 35 by piston rod 59.

Also connected to the cylinder 65 are exhaust conduits 67 and 68, connected through valves 70 and 71, respectively, to an air exhaust conduit 72 which is open to the atmosphere.

Valves 63, 64, 70 and 71 may be manually or otherwise set into either of two conditions by a common operating element diagramatically indicated at 73. When the valves are set as shown in FIG. 1, with valves 64 and 71 open and valves 63 and 70 closed, air under pressure is applied from reservoir 56 through a manually adjustable throttling valve 69 in the conduit 60 to force the pistons 35 and 66 to the right, causing piston 35 to force hot liquid in the right-hand end of cylinder 34 through conduit 40 and into the heating chamber 29. Accordingly, the spheres 25 and 26 expand as a unit, displacing the outer space liquid into the cylinder of press 85. The rate of flow of the fluid through conduit 40 may be varied by adjusting valve 69 to thereby change the speed of operation of the press 85.

As the piston 35 moves to the right it draws cold fluid through conduit 43 into the left-hand end of the cylinder 34.

Upon simultaneously setting the various control valves 63, 64, 70 and 71 to their alternate conditions, wherein valves 63 and 70 are open and valves 64 and 71 are closed, air under pressure from the reservoir 56 will be applied to the right-hand end of cylinder 65, to force the pistons 35, 66 to the left, thereby pumping cold liquid in the left-hand end of cylinder 34 through conduit 90 and into the heating chamber 29, causing the spheres 25, 26 to contract, thus withdrawing the outer space fluid from the press 85 so that the piston 86 thereof will be retracted. Concurrently, hot fluid will be drawn through conduit 36 into the right-hand end of cylinder 34.

As such contraction continues, the inner space liquid within the sphere 25 will be displaced into the tank 53, causing it to rise to its upper level $a$, thereby charging the reservoir 56 with an additional amount of air.

Obviously, the reservoir 56 can be utilized as a source of continuous air under pressure to power pneumatically-powered motors, turbines, pumps, etc. For this purpose, an outlet 75 is connected through a suitable valve 76 to the outlet conduit 60 of the air reservoir 56. Such air outlet can also be used to initially pressurize the system.

Description of First Alternative Embodiment

Figure 5:
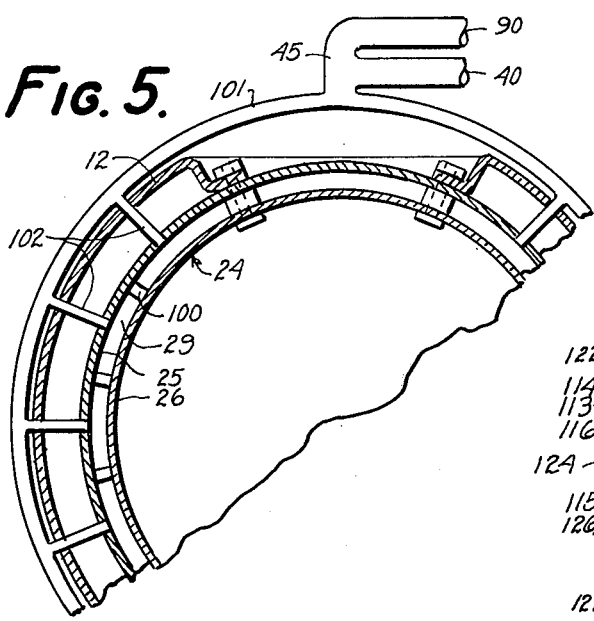
FIG. 5 is a sectional view through a modified form of the displacement unit.

FIG. 5 illustrates a modified form of the invention in which elements similar to those depicted in FIG. 1 are referred to by similar reference numerals. In this form of the invention, the inner and outer vessels 25 and 26 of the shell 24 are shown as being connected together by studs 100 welded or otherwise integrally connected therebetween to cause the vessels to expand or contract together as a unit.

Hot and cold gases such as steam and cold air, respectively, are alternately fed through conduits 40 and 90 which are branched together at 45 and are connected to a manifold 101 extending around the spherical container 12. Injectors 102 are spaced along the manifold 101 and project through the vessel 25 to inject the gases at different points around the heating chamber 29. This enables a more uniform and faster heating and cooling of the shell 24. Hot and cold liquids could also be used to alternately expand and contract the shell 24.

In order to permit expansion and contraction of the shell 24, the injectors 102 may be formed with flexible conduit sections similar to section 52 (FIG. 3).

Description of Second Alternative Embodiment

Figure 6:
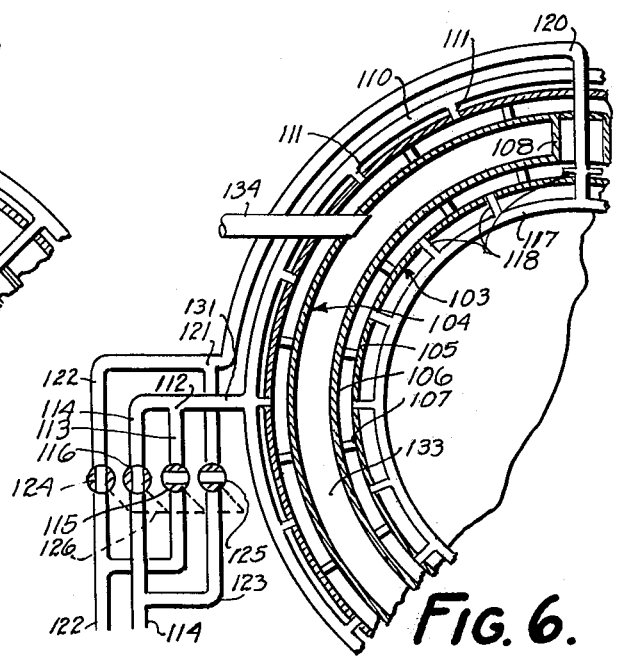
FIG. 6 is a sectional view through another modified form of the displacement unit.

FIG. 6 illustrates another modified form of the invention in which the outer pressure container is omitted. An inner double-walled shell 103 and an outer double-walled shell 104 are provided, the shells being each similar to shell 24 shown in FIG. 5. That is, each shell comprises an inner spherical wall or vessel 105 and an outer wall or vessel 106 spaced in fixed relation to each other by studs 107. Shells 103 and 104 are spaced relative to each other at their upper ends by a hollow column 108 integrally connected at opposite ends to the shells.

A manifold 110, similar to manifold 101 of FIG. 5, extends around the outer shell 104 and is connected to a series of spaced injectors 111 attached to the outer vessel 106 of shell 104. Manifold 110 is branched at 112 to a hot fluid conduit 113 and a cold fluid conduit 114 having valves 115 and 116, respectively, therein.

A second manifold 117 extends around the interior of the inner shell 103 and is connected to spaced injectors 118 for injecting fluid into the heating chamber of shell 103. Manifold 117 is connected to conduit 120 which is branched at 121 to a hot fluid conduit 122 and a cold fluid conduit 123 having valves 124 and 125, respectively, therein.

Valves 115, 116, 124 and 125 are manually or otherwise set into either of two conditions by a common operating element schematically indicated at 126.

When the valves are set as shown in FIG. 6, with valves 116 and 124 open and valves 115 and 125 closed, hot fluid will be supplied through supply conduits 122, 120 and manifold 117 to the inner shell 103 to expand the same while, concurrently, cold fluid will be supplied through conduits 114, 131 and manifold 110 to the outer shell 104 to contract the same.

The space 133 between the two shells 103 and 104 is filled with a suitable liquid which is thus displaced through an outlet conduit 134 to operate a suitable liquid-operated device at a rate depending on both the contraction of the outer shell 104 and the expansion of inner shell 103.

Conversely, when the valves 115, 116, 124 and 125 are set in their alternate conditions with valves 115 and 125 open and valves 116 and 124 closed, hot fluid will be applied to the outer shell 104 and cold fluid will be applied to the inner shell 103 to expand the former and contract the latter to draw liquid back through conduit 134 into the space 133.

Description of Third Alternative Embodiment

Figure 7:
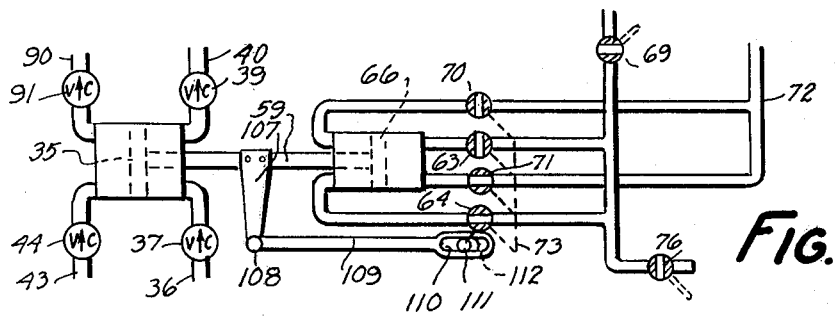
FIG. 7 is a schematic view of a modification of part of the apparatus shown in FIG. 1.
Figure 8:
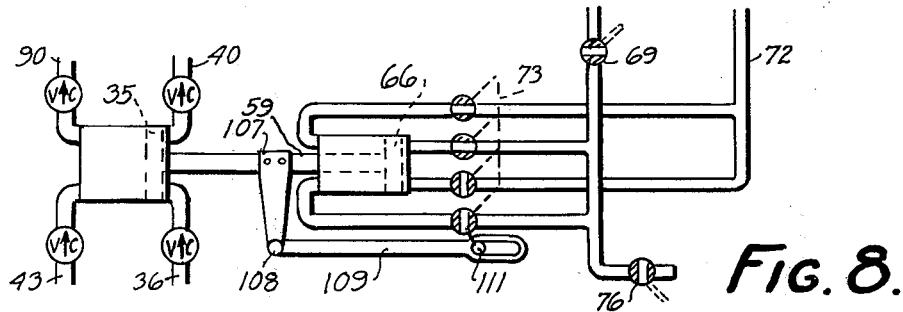
FIG. 8 is a schematic view similar to FIG. 7 but illustrating the parts in an alternative position.

FIGS. 7 and 8 illustrate a modified form of the invention in which elements similar to those depicted in FIG. 1 are referred to by similar reference numerals. In this form of the invention, means are provided for automaticaly setting the valves 63, 64, 70 and 71 in alternate conditions as the pistons 35, 66 approach the opposite ends of their travel. For this purpose, a crosshead 107 is attached to the piston rod 59 and is pivoted at 108 to a link 109. The latter has an elongate slot 110 which slidably embraces a pin 111 carried by an arm 112 that actuates the common operating element 73 for the valves 63, 64, 70 and 71 through valve 64.

Consider the valves 63, 64, 70 and 71 as being in the same conditions as depicted in FIG. 1 and that the pistons 35, 66 (shown midway through their strokes) are being driven to the right to force heated fluid through conduit 40 into the heating chamber 29. When the pistons 35, 66 approach the right-hand ends of their travel, link 109 picks up the arm 112, rocking the same counterclockwise to reverse the conditions of the valves 63, 64, 70 and 71 to that shown in FIG. 8. Accordingly, the pistons 35, 66 will now be driven leftwardly, cutting off the flow of hot fluid through the conduit 40 and causing piston 35 to force cold fluid through conduit 90 into the heating chamber 29.

As the pistons 35, 66 approach the left-hand ends of their travel, link 109 will again reverse the condition of the valves 63, 64, 70 and 71 to that shown in FIG. 7 to repeat the foregoing cycles of operation.

While I have shown and described various embodiments of my invention, it will be obvious that changes in form and details of the apparatus may be made by those skilled in the art, and it is therefore contemplated to cover by the appended claims any such modifications as fall within the true spirit of my invention. For example, the apparatus could be modified to derive heat from a source, or sources, other than a hot or warm fluid, or fluids, as its source of power. Heat from such sources includes radiant heat, heat of direct combustion of gas or other fuel in the apparatus, heat of electrical resistance, heat of chemical reaction, etc.

What I claim is:

1. Apparatus for transducing heat energy into mechanical energy, comprising:
    a fluid-tight container having a relatively low coefficient of thermal expansion;
    a fluid in said container;
    a fluid-pressure-operated device;
    means communicating said fluid in said container with said device;
    a body immersed in said fluid in said container, said body having a relatively high coefficient of thermal expansion; and
    means for changing the temperature of said body whereby to change the volume thereof to cause said fluid to operate said device.

2. Apparatus as defined in claim 1 wherein said fluid has a relatively high coefficient of thermal expansion.

3. Apparatus as defined in claim 1 wherein said body is substantially spherical.

4. Apparatus as defined in claim 1 wherein said body comprises a pair of nested inner and outer at least substantially spherical vessels;
    means supporting said vessels to form a space therebetween; and
    means for introducing a heated fluid into said space whereby to expand said body to cause said fluid to operate said device.

5. Apparatus as defined in claim 4 wherein said last-mentioned means comprises means for introducing said heated fluid at a plurality of spaced points in said space.

6. Apparatus as defined in claim 3 wherein said body has a cavity therein, and wherein said last-mentioned means comprises means for passing a heated fluid through said cavity.

7. Apparatus as defined in claim 4 wherein said last-mentioned means comprises means for introducing said heated fluid into said space adjacent the top of said vessels; and
    means adjacent the bottom of said vessels forming a drain for removing said heated fluid whereby said heated fluid flows between said vessels under the influence of gravity.

8. Apparatus as defined in claim 1 wherein said last-mentioned means comprises means for alternately heating and cooling said body.

9. Apparatus as defined in claim 1 wherein said body comprises a pair of nested inner and outer at least substantially spherical vessels;
    means supporting said vessels to form a space therebetween; and
    means for alternately introducing a relatively hot and a relatively cold fluid into said space whereby to cause said body to alternately expand and contract.

10. Apparatus as defined in claim 9 wherein said inner vessel is filled with an additional fluid;
    a second fluid-pressure-operated device; and
    means communicating said second device with said additional fluid whereby expansion and contraction of said body will cause said additional fluid to operate said second device.

11. A device as defined in claim 10 wherein said second device is effective to operate said fluid introducing means.

12. Apparatus as defined in claim 4 wherein said inner vessel is filled with an additional fluid;
    a pump for pumping said heated fluid into said space; and
    means operable by said additional fluid when displaced by said inner vessel for operating said pump.

13. Apparatus as defined in claim 10 wherein said additional fluid has a relatively low coefficient of thermal expansion.

14. Apparatus as defined in claim 1 wherein said body has a central cavity therein and a second cavity intermediate said central cavity and the exterior thereof;
    means comprising a first pump for pumping relatively hot fluid into said second cavity whereby to cause said body to expand;
    means comprising a second pump for pumping relatively cold fluid into said cavity whereby to cause said body to contract;
    additional fluid in said central cavity;
    a second fluid-pressure-operated device;
    means communicating said additional fluid with said second device whereby expansion and contraction of said body will cause said additional fluid to operate said second device; and
    means for causing said second device to selectively operate said first and second pumps.

15. Apparatus as defined in claim 1 wherein said last-mentioned means comprises a first control device for heating said body;
    a second control device for cooling said body; and
    means operable in response to expansion of said body for actuating said second control device;
    said last-mentioned means being operable in response to contraction of said body for actuating said first control device.

16. Apparatus as defined in claim 1 wherein said body comprises a pair of nested inner and outer at least substantially spherical vessels;
    means supporting said vessels to form a cavity therebetween;

a first control device for introducing a relatively hot fluid into said cavity;

a second control device for introducing a relatively cold fluid into said cavity; and means responsive to expansion of said body for causing operation of said second control device;

said last-mentioned means being responsive to contraction of said body for causing operation of said first control device.

17. Apparatus for transducing heat energy into mechanical energy comprising:

a hollow body having a relatively high coefficient of thermal expansion;

a fluid in said body, said fluid having a relatively low coefficient of thermal expansion;

a fluid-pressure-operated device;

means communicating said fluid in said body with said device; and means for changing the temperature of said body whereby to change the volume thereof to cause said fluid to operate said device.

18. apparatus for transducing heat energy into mechanical energy comprising:

a first fluid-tight hollow body having a relatively high coefficient of thermal expansion;

a fluid in said body;

a fluid-pressure-operated device;

means communicating said fluid in said body with said device;

a second fluid-tight hollow body immersed in said fluid in said first body;

said second body having a relatively high coefficient of thermal expansion; and means for concurrently increasing the temperature of one of said bodies and decreasing the temperature of the other of said bodies whereby to displace said fluid to operate said device.

* * * * *